(12) United States Patent
Rahmati et al.

(10) Patent No.: US 11,741,577 B2
(45) Date of Patent: Aug. 29, 2023

(54) METHOD AND APPARATUS FOR MULTI-FRAME BASED DETAIL GRADE MAP ESTIMATION AND ADAPTIVE MULTI-FRAME DENOISING

(71) Applicant: Samsung Electronics Co., Ltd., Gyeonggi-do (KR)

(72) Inventors: Mojtaba Rahmati, San Diego, CA (US); Dongwoon Bai, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 301 days.

(21) Appl. No.: 17/244,504

(22) Filed: Apr. 29, 2021

(65) Prior Publication Data
US 2022/0188986 A1  Jun. 16, 2022

Related U.S. Application Data

(60) Provisional application No. 63/124,247, filed on Dec. 11, 2020.

(51) Int. Cl.
*G06T 5/00* (2006.01)
*G06T 5/50* (2006.01)

(52) U.S. Cl.
CPC ............. *G06T 5/002* (2013.01); *G06T 5/50* (2013.01); *G06T 2207/20012* (2013.01)

(58) Field of Classification Search
CPC . G06T 5/002; G06T 5/50; G06T 2207/20012; G06T 5/10; G06T 2207/10016; G06T 2207/20064; G06T 2207/10024

USPC ........................................................ 382/275
See application file for complete search history.

(56) References Cited

U.S. PATENT DOCUMENTS

| | | | |
|---|---|---|---|
| 8,977,012 B2 | 3/2015 | Ioffe et al. | |
| 9,171,355 B2 | 10/2015 | Zhuo et al. | |
| 9,633,416 B1* | 4/2017 | Lee | H04N 5/213 |
| 9,721,329 B2 | 8/2017 | Bertens | |
| 9,805,294 B2 | 10/2017 | Liu et al. | |
| 2009/0041373 A1* | 2/2009 | Incesu | G06T 5/20 |
| | | | 348/607 |
| 2012/0093419 A1 | 4/2012 | Liba et al. | |
| 2016/0086317 A1* | 3/2016 | Oron | G06T 5/20 |
| | | | 382/275 |

FOREIGN PATENT DOCUMENTS

CN  108694705  12/2020

OTHER PUBLICATIONS

C. Taswell, "The what, how, and why of wavelet shrinkage denoising" in Computing in Science & Engineering, vol. 2, No. 3, pp. 12-19, May-Jun. 2000, doi: 10.1109/5992.841791. (Year: 2000).*

* cited by examiner

*Primary Examiner* — Emily C Terrell
*Assistant Examiner* — Emmanuel Silva-Avina
(74) *Attorney, Agent, or Firm* — The Farrell Law Firm, P.C.

(57) ABSTRACT

A method and system are provided. The method includes determining a difference map between a reference frame and a non-reference frame, determining a local variance of the reference frame, determining a detail power map based on a difference between the determined local variance and the determined difference map, and determining a detail grade map based on the determined detail power map.

18 Claims, 4 Drawing Sheets

METHOD AND APPARATUS FOR MULTI-FRAME BASED DETAIL GRADE MAP ESTIMATION AND ADAPTIVE MULTI-FRAME DENOISING

PRIORITY

This application is based on and claims priority under 35 U.S.C. § 119(e) to U.S. Provisional Patent Application Ser. No. 63/124,247, filed on Dec. 11, 2020, the entire contents of which are incorporated herein by reference.

FIELD

The present disclosure is generally related to image denoising.

BACKGROUND

In multi-frame based detail grade map estimation and denoising, it is desirable to provide a practical multi-frame image denoising solution and to enhance multi-frame image processing quality.

SUMMARY

According to one embodiment, a method includes determining a difference map between a reference frame and a non-reference frame, determining a local variance of the reference frame, determining a detail power map based on a difference between the determined local variance and the determined difference map, and determining a detail grade map based on the determined detail power map.

According to one embodiment, a system includes a memory and a processor configured to determine a difference map between a reference frame and a non-reference frame, determine a local variance of the reference frame, determine a detail power map based on a difference between the determined local variance and the determined difference map, and determine a detail grade map based on the determined detail power map.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present system and method provide a multi-frame based detail grade map estimation, where the estimated map specifies a confidence score to distinguish between the detail regions and highly noise and/or local motion regions. The estimated detail grade map is used to control the adaptive spatial denoising power which is applied as a post-processing over the temporal denoising (fusion) results.

The present system and method also provides an adaptive spatial denoising structure, where the level of denoising may be controlled by the estimated detail grade map with applying weaker denoising in detail regions and stronger denoising in noisy and/or local motion regions.

Figure 1:
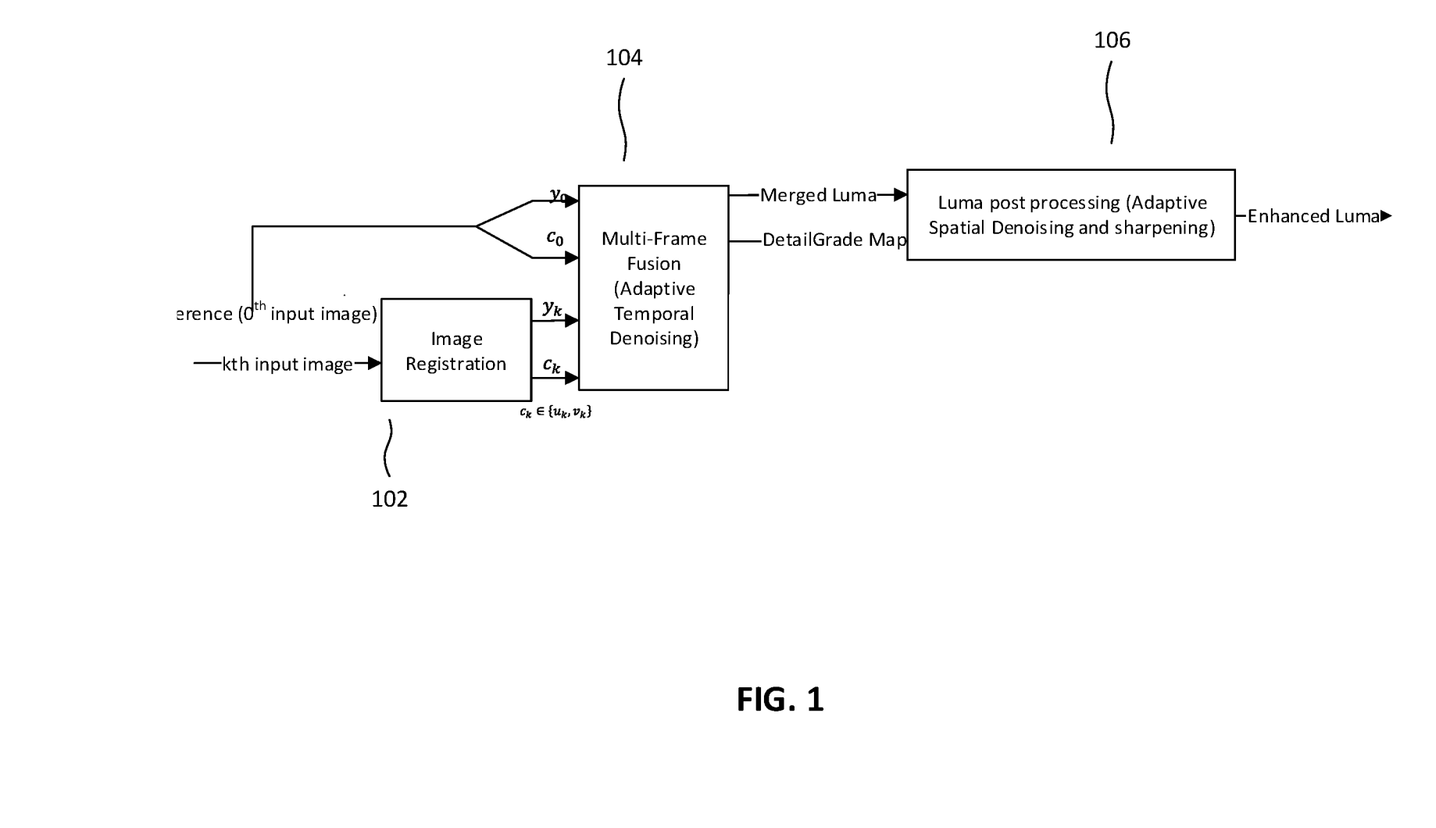
FIG. 1 illustrates a diagram of a YUV color encoding scheme domain multi-frame denoising (MFD) system, according to an embodiment.

FIG. 1 illustrates a diagram of a YUV color encoding scheme domain MFD system, according to an embodiment. A reference image and input image are register at the image registration block 102. After applying image registration over non-reference frames, temporal merging is applied independently per frame at the multi-frame fusion block 104. The merged frame is passed to a post-processing block 106 to further reduce the noise level, and enhance edges and details.

As a model, the present system and method considers a burst of N noisy images with $y_k(x, y)$ denoting the luminance of the k-th warped image frame (i.e., post image registration to align with the reference frame), and $c_k(x, y)$ denoting the chrominance of the k-th image frame (either U or V channels), $k \in \{0, \ldots, N-1\}$ and (x, y) denoting the 2D spatial pixel position. Furthermore, $Y_{k,s}(i, j)$ is defined as the (i,j)-th wavelet coefficient of $S \in \{LH, HL, HH, LL\_LH, LL\_LH, LL\_HH, LL\_LL\}$ sub-band of $y_k$ and $C_{k,s}(i,j)$ as (i,j)-th wavelet coefficient of s sub-band of $c_k$.

In an MFD structure, the temporal denoising (e.g., frame fusion) is followed by spatial denoising (e.g., non-local mean (NLM) or transform domain based denoising) and sharpening (e.g., unsharp masking) to further reduce the noise and enhance the quality. In spatial denoising, weak denoising and strong sharpening may be utilized in texture and detail regions and strong denoising and weak sharpening may be utilized in flat and noisy regions. Furthermore, the level of temporal averaging varies depending on the level of alignment between the reference frame and the non-reference frames such that more temporal averaging is possible in well aligned regions. The level of alignment varies throughout the image plane due to either local motions or residual global misalignment caused by imperfect image registration.

Therefore, the present system and method compensates for the imbalance in temporal denoising through stronger spatial denoising. The detail grade map delivers a grade map in the range of −1 to 1 with the grade of 1 representing strong details and the grade of −1 representing local motion and/or noisy region. To determine detail grade map, a difference map ($D_k(i,j)$ with $i \in \{1, \ldots, W\}$, $j \in \{1, \ldots, H\}$) between a reference frame (reference image) and non-reference frame (noisy, input image) is determined, as in Equation (1).

$$d_k(i,j) = y_0(i,j) - y_k(i,j), i \in \{1, \ldots, W\}, j \in \{1, \ldots, H\}$$

$$d_{Blur,k} = \text{Blur}(d_k)$$

$$D_k = \text{Blur}(d_{Blur,k}^2) \quad (1)$$

Any Blur operation may be utilized, such as 5×5 Gaussian filtering or 5×5 box filtering. Then, the detail power map is determined as in Equation (2):

$$\text{DetailPower}(i, j) = \text{RefVar}(i, j) - \frac{\text{DetailDweight}}{2 \times (N-1)} \sum_{k=1}^{N-1} D_k(i, j) \quad (2)$$

with, as in Equation (3), and (4):

$$\text{RefVar} = \text{Min}(\text{Blur}(y_{G,0}^2) - \text{Blur}(y_{G,0})^2, \text{VarMax} + y_{G,0}) \quad (3)$$

$$y_{G,0} = \text{Blur}(y_0) \quad (4)$$

RefVar represents a local variance of the reference frame, or the detail and noise power, or roughly speaking RefVar(i, j)$\approx \sigma_{detail}^2(i, j) + \sigma_{noise}^2(i,j)$. DetailDweight and VarMax are tunable parameters. Furthermore, in non-motion areas and with perfect alignment, $D_k(i,j) \approx 2\sigma_{noise}^2(i,j)$. Therefore, in perfectly aligned cases, the detail power map is, as in Equation (5).

$$\text{DetailPower}(i,j) \approx \sigma_{detail}^2(i,j) - \text{DetailDweight} \times \sigma_{noise}^2(i, j) \quad (5)$$

For strong detail regions with $\sigma_{detail}^2(i,j) \gg \text{DetailDweight} \times \sigma_{noise}^2(i, j)$, the detail power map represents the detail power and for weak detail regions with $\sigma_{detail}^2(i,j) \ll \text{DetailDweight} \times \sigma_{noise}^2(i, j)$, the detail power map in Equation (5) becomes negative and its magnitude represents the noise power. Furthermore, in local motion areas where $D_k(i, j) \gg \text{RefVar}(i,j)$, the detail power map of Equation (5) becomes negative with large magnitude. The detail power map indicates the detail grade for DetailPower(i, j)>0 and indicates the noise and motion power for DetailPower(i, j)<0. Finally, the detail grade is obtained with normalizing and clipping the above detail power as in Equation (6).

$$\text{DetailGrade}(i, j) = \text{Blur}\left(\max\left(\min\left(\frac{\text{DetailPower}(i, j)}{\text{DetailNorm}}, 1\right), -1\right)\right) \quad (6)$$

DetailNorm is a tunable parameter.

In multi-frame fusion, due to both local and global motions, the level of merging (i.e., temporal denoising) varies spatially such that the most temporal averaging is achieved in static and well-aligned regions and the least averaging occurs in local motion areas. To properly configure post-processing block DetailGrade is passed to a post-processing block to adjust the level of denoising and sharpening dynamically according to the detail grade map. The goal is to apply less denoising and more sharpening in detail area which are represented by DetailGrade(i,j)→1 and apply more denoising, less sharpening and less dithering in local motion area and/or flat area which are represented by DetailGrade(i,j)→−1.

The calculated detail grade map may be utilized to adaptively control denoising power such that stronger denoising will be applied in noisy flat regions and/or motion areas, and weaker denoising in detail regions. The denoising power can be controlled using the detail grade map by adjusting the noise power. In transform domain denoising, the regular shrinkage operation is applied, as in Equation (7):

$$\hat{Y}_{0,s}(i,j) = \frac{|\tilde{Y}_{0,s}(i,j)|^2}{|\tilde{Y}_{0,s}(i,j)|^2 + \sigma^2} \tilde{Y}_{0,s}(i,j) \quad (7)$$

which can be adaptively controlled by the detail grade map as in Equation (8):

$$\hat{Y}_{0,s}(i,j) = \frac{|\tilde{Y}_{0,s}(i,j)|^2}{|\tilde{Y}_{0,s}(i,j)|^2 + DnDetailGrade(i,j) \times \sigma^2} \tilde{Y}_{0,s}(i,j) \quad (8)$$

where $\sigma^2$ is the tuning parameter and DnDetailGrade is obtained as in Equation (9):

DnDetailGrade(i,j)=1−min(DetailDN$_{slp}$×DetailGrade(i,j),1)+DetailDN_offset    (9)

where DetailDN_slp and DetailDN_offset are the tuning parameters, DetailGrade(i, j) is the detail grade map and s is the sub-band index in the transform domain (e.g., an undecimated Haar transformation).

Figure 2:
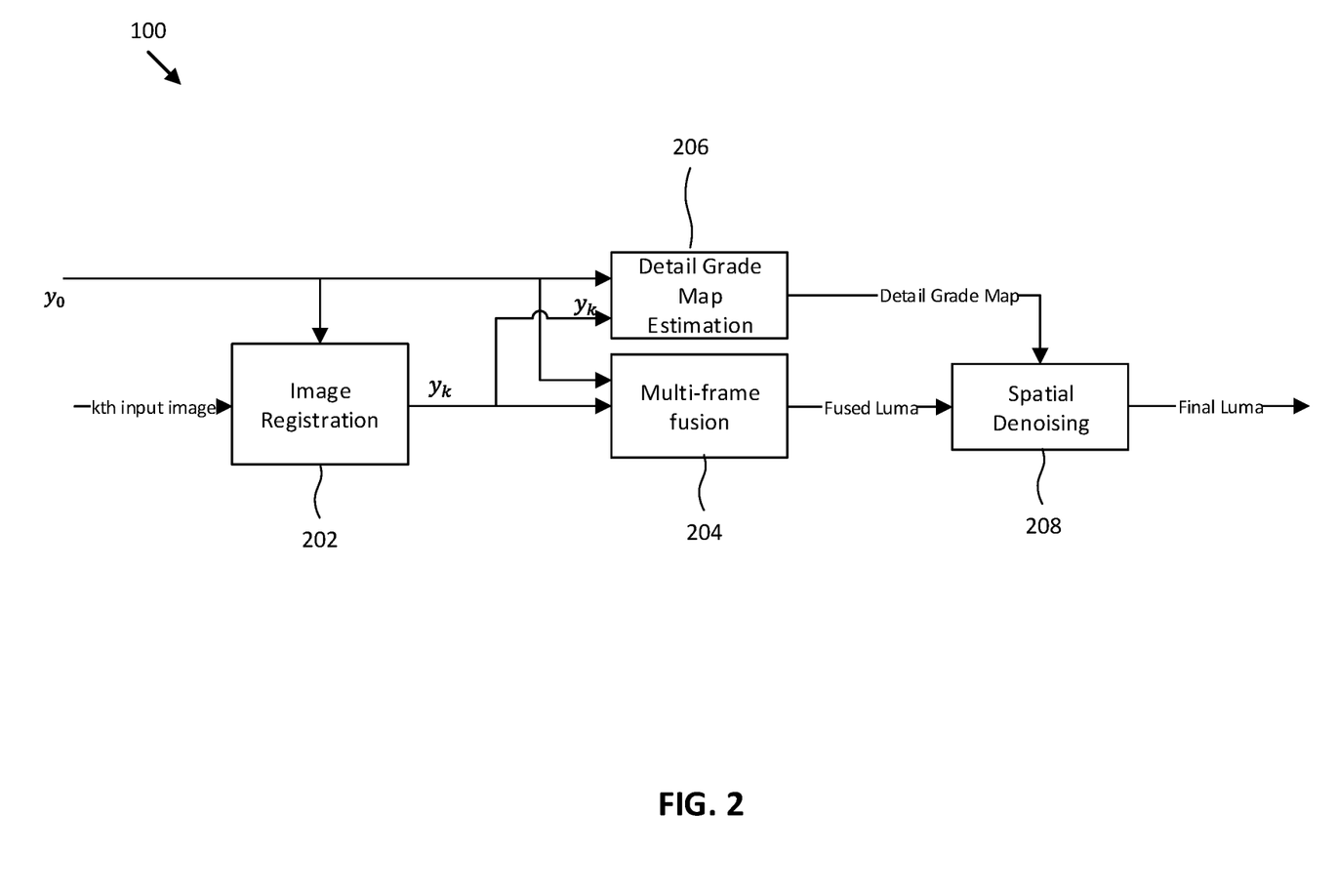
FIG. 2 illustrates a diagram of an MFD system, according to an embodiment.

FIG. 2 illustrates a diagram of an MFD system, according to an embodiment. Image registration is performed on a reference image $y_0$ and an input image at the image registration block 202. The input image may be registered as a noisy input image $y_k$. The reference image and the input image may be fused at the multi-frame fusion block 204. At the detail grade map estimation block 206, a detail grade map is determined based on the input image and the reference image. At the spatial denoising block 208, spatial denoising may be performed based on the detailed grade map and the fused luma output from the multi-frame fusion block 206 to produce the final luma.

Figure 3:
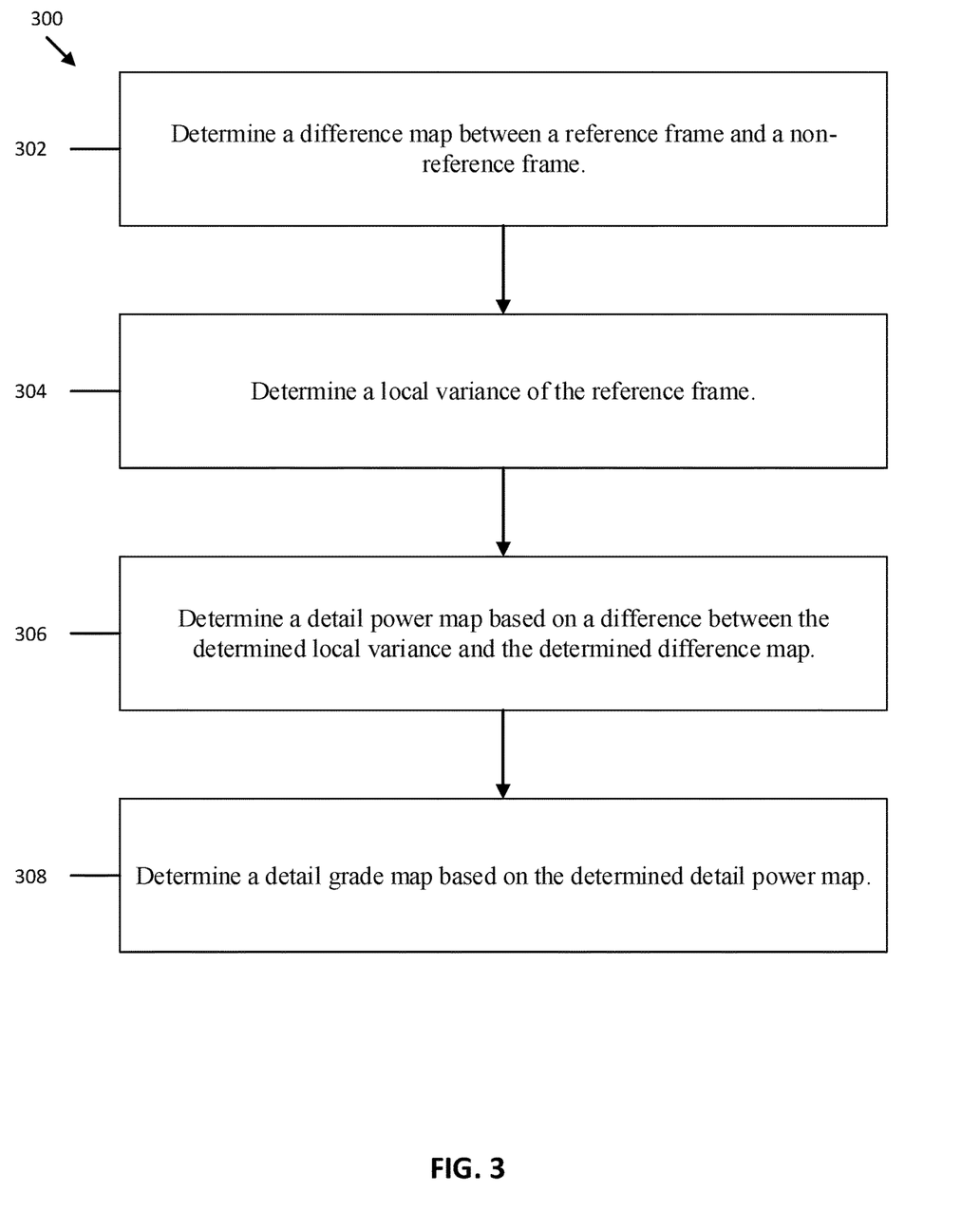
FIG. 3 illustrates a flowchart for a method of denoising, according to an embodiment.

FIG. 3 illustrates a flowchart 300 for a method of denoising, according to an embodiment. At 302, the system determines a difference map between a reference frame and a non-reference frame. At 304, the system determines a local variance of the reference frame. At 306, the system determines a detail power map based on a difference between the determined local variance and the determined difference map. At 308, the system determines a detail grade map based on the determined detail power map.

Figure 4:
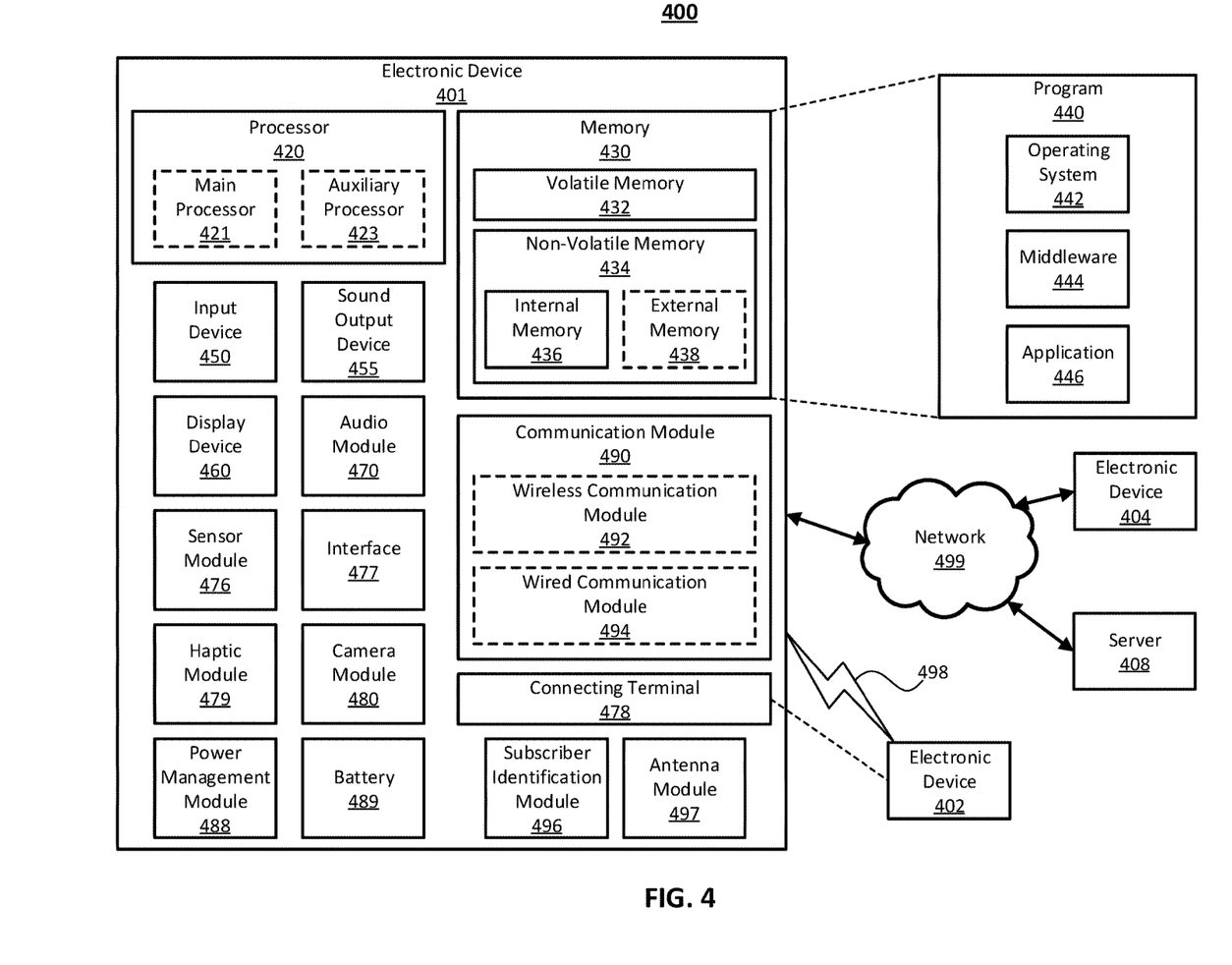
FIG. 4 illustrates a block diagram of an electronic device in a network environment, according to one embodiment.

FIG. 4 illustrates a block diagram of an electronic device 401 in a network environment 400, according to one embodiment. Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). The electronic device 401 may communicate with the electronic device 404 via the server 408. The electronic device 401 may include a processor 420, a memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In one embodiment, at least one (e.g., the display device 460 or the camera module 480) of the components may be omitted from the electronic device 401, or one or more other components may be added to the electronic device 401. In one embodiment, some of the components may be implemented as a single integrated circuit (IC). For example, the sensor module 476 (e.g., a fingerprint sensor, an iris sensor, or an illuminance sensor) may be embedded in the display device 460 (e.g., a display).

The processor 420 may execute, for example, software (e.g., a program 440) to control at least one other component (e.g., a hardware or a software component) of the electronic device 401 coupled with the processor 420, and may perform various data processing or computations. As at least part of the data processing or computations, the processor 420 may load a command or data received from another component (e.g., the sensor module 476 or the communication module 490) in volatile memory 432, process the command or the data stored in the volatile memory 432, and store resulting data in non-volatile memory 434. The processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or execute a particular function. The auxiliary processor 423 may be implemented as being separate from, or a part of, the main processor 421.

The auxiliary processor 423 may control at least some of the functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to one embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, or a keyboard.

The sound output device 455 may output sound signals to the outside of the electronic device 401. The sound output device 455 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to one embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to one embodiment, the audio module 470 may obtain the sound via the input device 450, or output the sound via the sound output device 455 or a headphone of an external electronic device 402 directly (e.g., wired) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly (e.g., wired) or wirelessly. According to one embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device 402. According to one embodiment, the connecting terminal 478 may include, for example, an HDMI connector, a USB connector, an SD card connector, or an audio connector (e.g., a headphone connector).

The haptic module 479 may convert an electrical signal into a mechanical stimulus (e.g., a vibration or a movement) or an electrical stimulus which may be recognized by a user via tactile sensation or kinesthetic sensation. According to one embodiment, the haptic module 479 may include, for example, a motor, a piezoelectric element, or an electrical stimulator.

The camera module 480 may capture a still image or moving images. According to one embodiment, the camera module 480 may include one or more lenses, image sensors, image signal processors, or flashes.

The power management module 488 may manage power supplied to the electronic device 401. The power management module 488 may be implemented as at least part of, for example, a power management integrated circuit (PMIC).

The battery 489 may supply power to at least one component of the electronic device 401. According to one embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. According to one embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or a standard of the Infrared Data Association (IrDA)) or the second network 499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to one embodiment, the antenna module 497 may include one or more antennas, and, therefrom, at least one antenna appropriate for a communication scheme used in the communication network, such as the first network 498 or the second network 499, may be selected, for example, by the communication module 490 (e.g., the wireless communication module 492). The signal or the power may then be transmitted or received between the communication module 490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. All or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

One embodiment may be implemented as software (e.g., the program 440) including one or more instructions that are stored in a storage medium (e.g., internal memory 436 or external memory 438) that is readable by a machine (e.g., the electronic device 401). For example, a processor of the electronic device 401 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising
   determining a difference map between a reference frame and a non-reference frame;
   determining a local variance of the reference frame;
   determining a detail power map based on a difference between the determined local variance and the determined difference map; and
   determining a detail grade map based on a ratio between the determined detail power map and a tunable parameter.

2. The method of claim 1, wherein the detail power map indicates a detail grade when the detail power map is greater than zero.

3. The method of claim 1, wherein the detail power map indicates a noise and motion power when the detail power map is less than zero.

4. The method of claim 1, wherein the detail power map is further determined based on a difference between the reference frame local variance and the determined difference map.

5. The method of claim 1, further comprising controlling a denoising power based on the determined detail grade map.

6. The method of claim 5, wherein controlling the denoising power comprises adjusting a noise power.

7. The method of claim 5, wherein controlling the denoising power comprises applying stronger denoising in noisy flat regions or motion areas.

8. The method of claim 5, wherein controlling the denoising power comprises applying weaker denoising in detail regions.

9. The method of claim 5, wherein controlling the denoising power comprises applying a shrinkage operation.

10. A system, comprising:
    a memory; and
    a processor configured to:
      determine a difference map between a reference frame and a non-reference frame;
      determine a local variance of the reference frame;
      determine a detail power map based on a difference between the determined local variance and the determined difference map; and
      determine a detail grade map based on a ratio between the determined detail power map and a tunable parameter.

11. The system of claim 10, wherein the detail power map indicates a detail grade when the detail power map is greater than zero.

12. The system of claim 10, wherein the detail power map indicates a noise and motion power when the detail power map is less than zero.

13. The system of claim 10, wherein the detail power map is further determined based on a difference between the reference frame local variance and the determined difference map.

14. The system of claim 10, further comprising controlling a denoising power based on the determined detail grade map.

15. The system of claim 14, wherein the processor is further configured to control the denoising power by adjusting a noise power.

16. The system of claim 14, wherein the processor is configured to control the denoising power by applying stronger denoising in noisy flat regions or motion areas.

17. The system of claim 14, wherein the processor is configured to control the denoising power by applying weaker denoising in detail regions.

18. The system of claim 14, wherein the processor is configured to control the denoising power by applying a shrinkage operation.

* * * * *